May 26, 1959     R. G. NORDQUIST     2,888,551
MULTI-REFLEX READING LIGHT UNIT
Filed Feb. 15, 1956     3 Sheets-Sheet 1
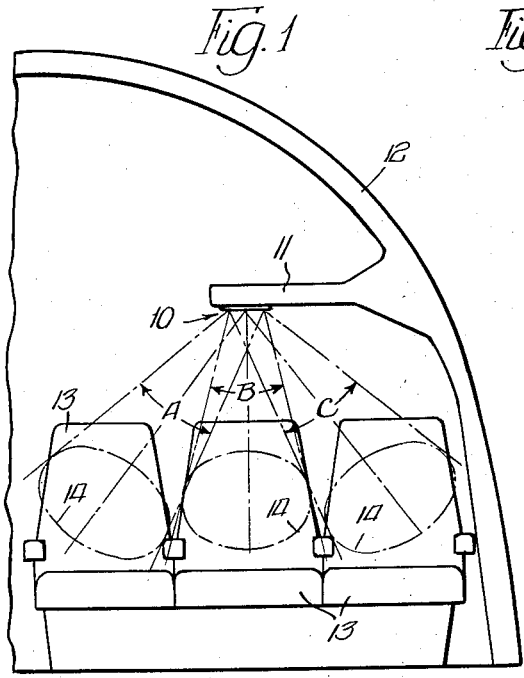
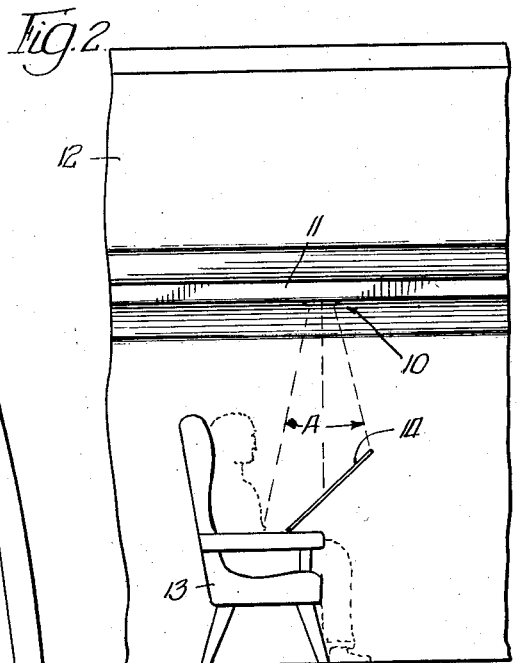
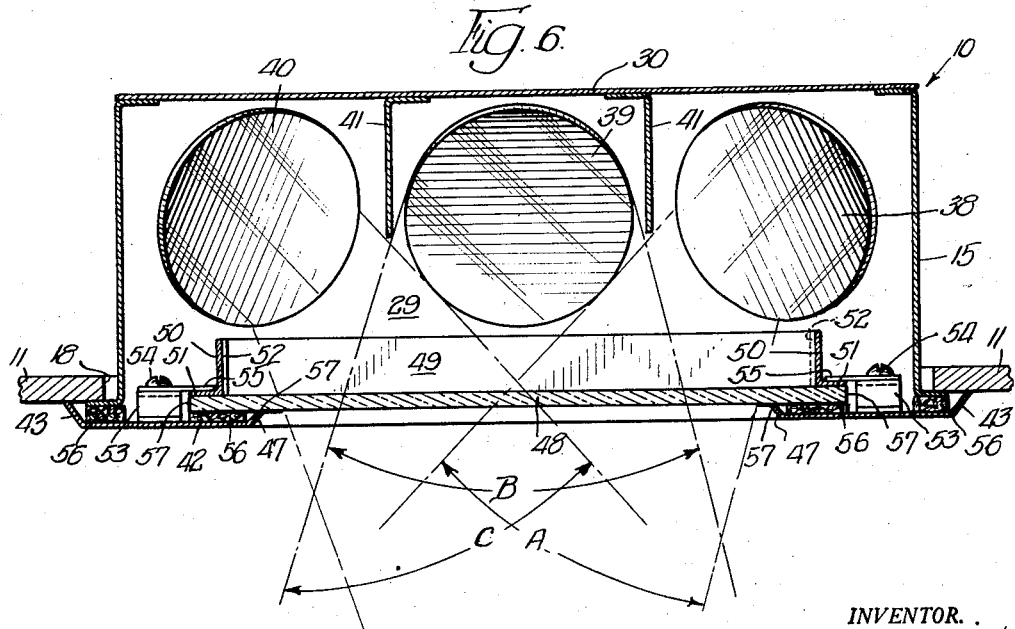
INVENTOR.
Robert G. Nordquist,
BY
Cromwell, Greist & Warden
ATTYS

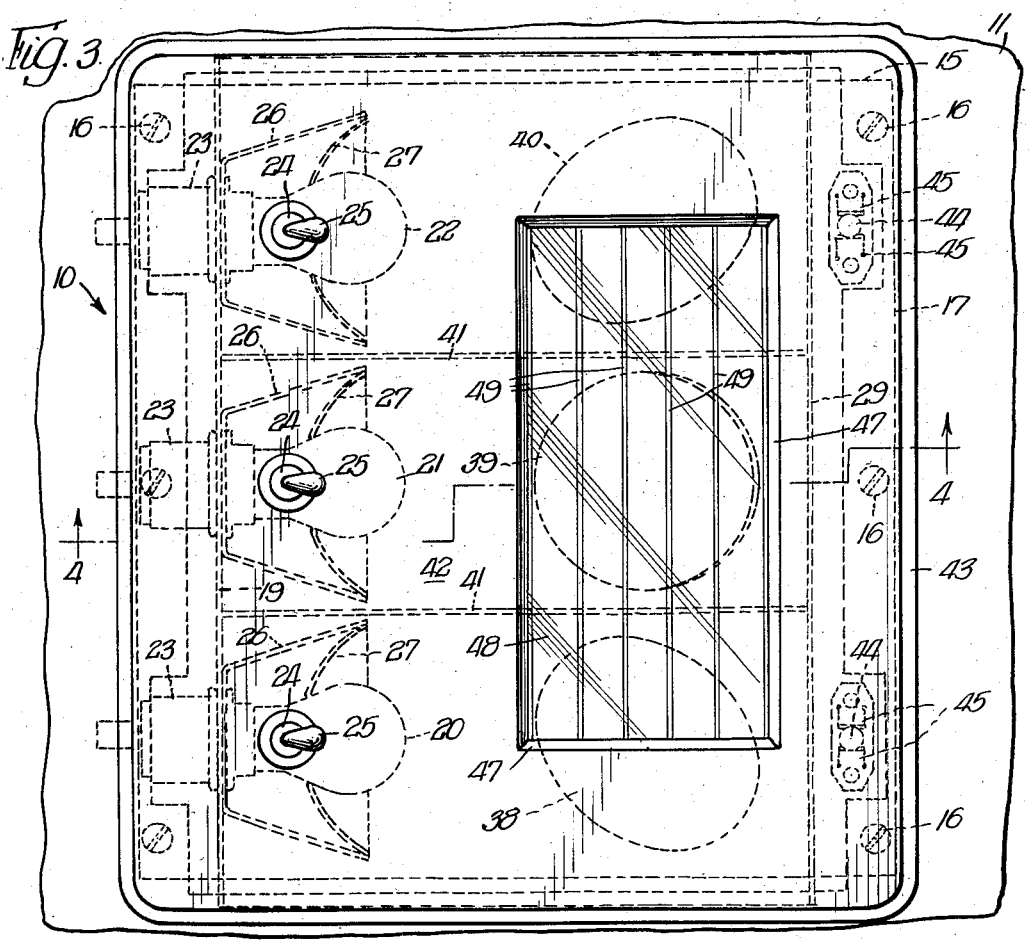
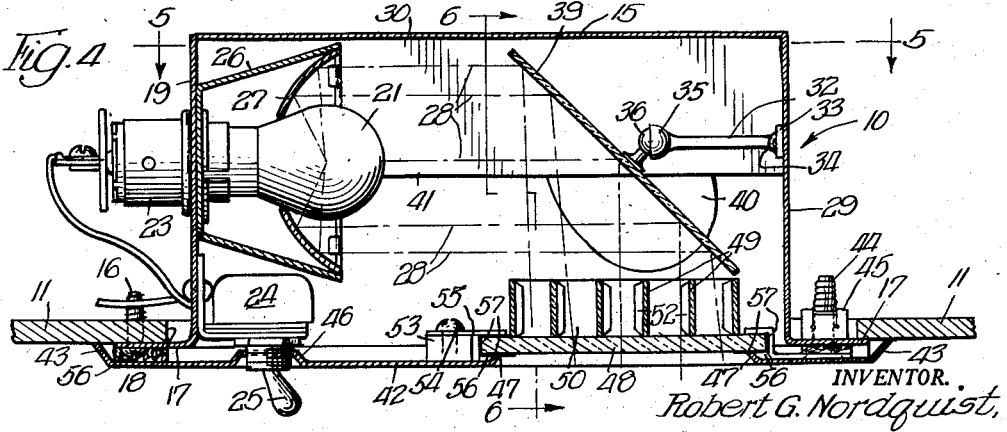

May 26, 1959 — R. G. NORDQUIST — 2,888,551
MULTI-REFLEX READING LIGHT UNIT

Filed Feb. 15, 1956 — 3 Sheets-Sheet 3

INVENTOR.
Robert G. Nordquist,
BY
Cromwell, Greist & Warden
Attys

United States Patent Office 2,888,551
Patented May 26, 1959

2,888,551

MULTI-REFLEX READING LIGHT UNIT

Robert G. Nordquist, Glen Ellyn, Ill., assignor to Patent License Corporation, Chicago, Ill., a corporation of Illinois Application February 15, 1956, Serial No. 565,657

9 Claims. (Cl. 240—7.35)

The present invention relates generally to a new and improved reading light of compact design particularly adapted for installation in spaces of limited vertical dimensions, which reading light unit is capable of efficiently defining and maintaining a plurality of fields of illumination which do not interfere with one another when used for individual reading purposes.

More specifically, the present invention is directed to a new and improved multi-directional reading light unit which utilizes a plurality of light sources to define separate fields of illumination, each of the fields being intercepted by reflex means in the form of reflecting surfaces which redirect the fields each in a different direction while maintaining the separate identity and definition of each of the fields.

In the designing of individualized reading light units for use in passenger vehicles and aircraft, particular attention is given to the compactness and lightweight features of the reading light units due to the emphasis on the development of vehicles or aircraft of lightweight construction. This emphasis has been further aided by the development and increasing widespread use of lightweight materials such as aluminum, which materials are capable of exhibiting the requisite strength while at the same time providing structures exhibiting lightweight properties. Furthermore, emphasis is present on the improvement of interior design of passenger vehicles and aircraft to increase the available space in the interior of the vehicle or aircraft thereby either increasing passenger revenue or improving passenger comfort and freedom of movement during relatively long trips.

As an example of the foregoing, improvements have been made in the design of baggage racks to reduce the vertical thickness of the same thereby providing more head space for the passenger seated directly below the rack as well as increased storage space above the rack. The added space afforded by this feature is of particular importance in aircraft where vertical height of the passenger cabin is normally more restricted than in the instance of land vehicles. To increase passenger revenue space, aircraft passenger cabins are often provided with more than a pair of abreast seats on either side of the center aisle. In many instances the number of seats abreast one another will total three and with such an arrangement the problem of providing adequate individualized reading lights is increased, particularly in the instance where available mounting and storage space for the light fixtures in the overhead bag rack is limited.

Modernly, the most important limitation concerning the mounting and storing of reading lights in the overhead bag rack resides in the reduced vertical thickness of new forms of bag racks. An additional limitation resides in the instance where the passenger cabin of an aircraft is convertible to an extent that one or two of the three abreast seats on one side of the aisle are removable; as, for example, when a particular aircraft is used for both deluxe and aircoach service. The lateral width of the baggage rack is often limited to provide more head space and accommodate the changes made in the seating arrangement. As a result of lateral and vertical limitations it has been found difficult to mount the various individualized lighting and air supply units in the baggage rack and in many instances it has been necessary to mount some of these units on the side walls of the cabin. Variations of this nature complicate manufacturing and assembling procedures and often results in inconvenient locations of some of the individualized units thereby reducing their operating efficiency.

It is an object of the present invention to provide a new and improved self-contained multi-light unit particularly adapted for reading purposes which is of compact design in both vertical and horizontal dimensions and which is readily installed and inexpensively manufactured and maintained.

Still another object is to provide a reading light unit of compact design which utilizes a plurality of light sources each controlled for individualized use, which light sources are carried in close association in a relatively small enclosure, the fields of illumination of the light sources being controlled to pass through a single aperture in the enclosure and yet maintain separate identity beyond the aperture to provide individualized illumination at spaced areas capable of accommodating changes in passenger seating arrangements.

A further object is to provide an improved reading light unit which is of relatively slight vertical width and horizontal length thereby allowing the same to be readily accommodated by mounting fixtures of limited dimensions, which unit includes a plurality of light sources each defining a unidirectional field of illumination directed horizontally, each of the fields being ultimately redirected through an aperture in the housing of the unit, the dimensions of which are substantially less than the combined dimensions of the fields of illumination, and the redirection of the fields of illumination being accomplished in such a manner as to maintain the separate identity of each field beyond the aperture and control the direction of each field beyond the aperture to cover a plurality of spaced reading areas, each of the areas being individualized so as not to interfere with adjacent areas.

Another object, in addition to the foregoing, is to provide a new and improved multi-reflex reading light unit which is provided with means capable of restricting reflective observance of the fields of illumination, including their sources, from points not within the redirected fields of illumination.

Other objects not specifically set forth will become apparent from the following detailed description made in conjunction with the drawings wherein:

Fig. 1 is a fragmentary schematic illustration of the interior of a passenger carrying vehicle or aircraft illustrating the positioning of the reading light unit of the present invention with respect to a plurality of adjacent passenger seats;

Fig. 2 is a fragmentary schematic view similar to Fig. 1 illustrating from side elevation a reading area provided by the reading light unit;

Fig. 3 is a bottom plan view of the reading light unit mounted in its operative position with a mounting surface which is fragmentarily shown;

Fig. 4 is a vertical section of the reading light unit taken along line 4—4 of Fig. 3;

Fig. 6 is a vertical section illustrating the reflectors in front elevation, the section being taken along line 6—6 of Fig. 4.

Figure 5:
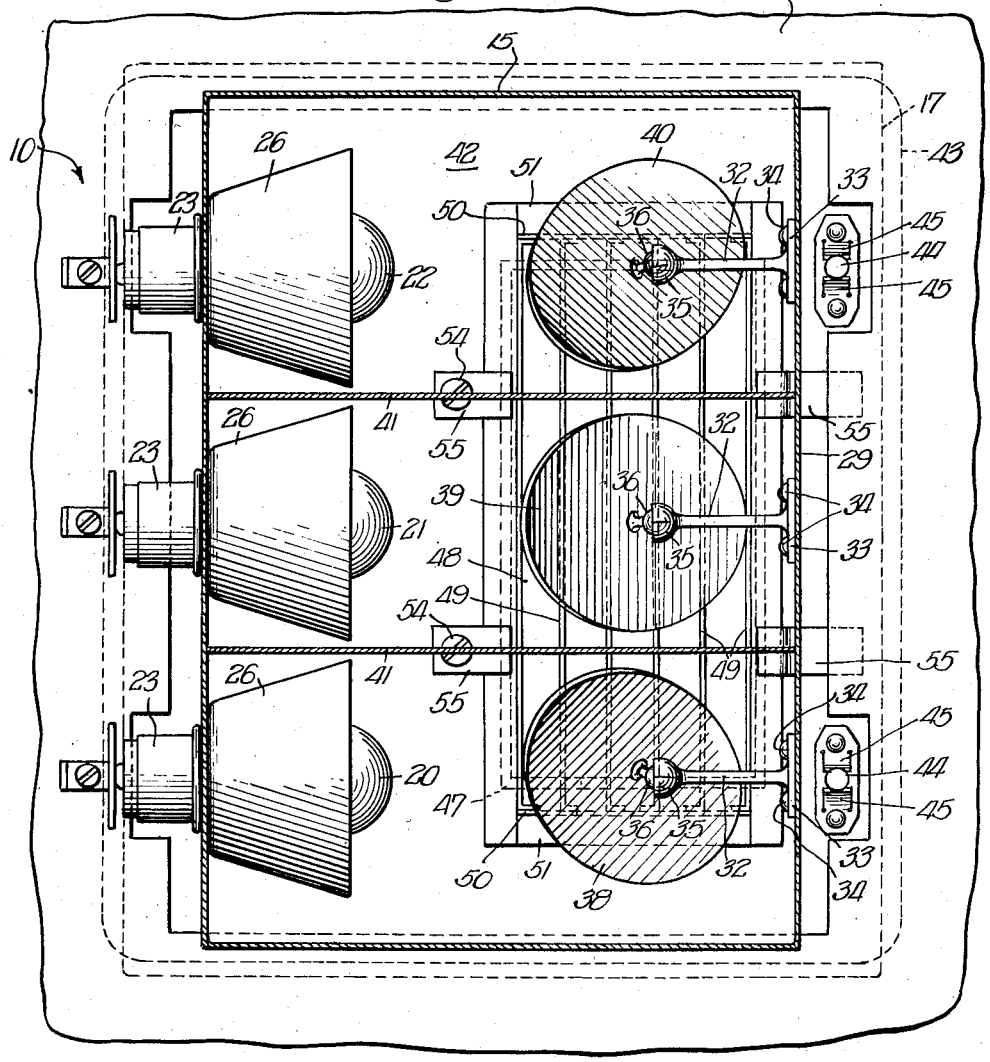
Fig. 5 is a top plan partial section taken along line 5—5 of Fig. 4.

Figs. 1 and 2 illustrate a typical installation of the multi-reflex reading light unit 10 of the present invention in an overhead baggage rack 11 carried by a side wall 12 of a passenger carrier such as an aircraft. As illustrated in Fig. 1, directly below the baggage rack 11 is positioned a seating unit which includes three passenger seats 13 abreast with one another and extending inwardly from the wall 12 of the aircraft cabin. The reading light unit 10 is carried near the inner end of the baggage rack 11 substantially directly over the center seat 13. As will subsequently be described, the unit 10 is equipped to provide three fields of illumination A, B and C which intersect one another as they pass through an aperture in the unit 10 but re-attain complete separation in order that each of the fields individually covers one of the reading planes 14 for each of the seats 13. As shown in Fig. 2, a passenger sitting in the innermost seat 13 is provided with a field of illumination A which supplies a reading plane 14 adequate to cover a source of reading material. Each of the fields of illumination A, B and C are directionally controlled so as to be incapable of interfering with passengers in adjacent seats 13 in the event that one of the individuals occupying a seat is using his reading light while the other individuals are not.

The structural details of the multi-reflex reading light unit 10 are shown in Figs. 3-6 and in referring to these figures it will be noted that a housing or enclosure 15 of inverted cup-shape is attached to the bottom wall of the baggage rack 11 by means of spaced screws 16 which extend through outwardly directed bottom flanges 17 integral with the vertical walls of the housing 15. The screws 16 are threadedly received inwardly of the edges of an opening 18 in the bottom wall of the baggage rack 11 through which the housing 15 is inserted.

A vertical wall 19 of the housing 15 carries a plurality of spaced light sources 20, 21 and 22 which, in turn, are carried by known types of light sockets 23 which are suitably received through apertures in the vertical wall 19 and fixedly clamped with respect thereto. Each of the sockets 23 has electrically connected thereto a toggle switch assembly 24 of known design provided with a downwardly directed switch lever 25 which may be manipulated to control actuation of the light source associated therewith. The light sockets 23 are further provided with cone-shaped hoods 26 which are suitably clamped in place and surround the light sources associated therewith. The outer ends of the hoods 26 carry inwardly directed parabolic reflectors 27 which are received about the light sources and which function to create a horizontally directed field of illumination formed primarily from parallel light rays directed forwardly from each of the light sources toward the opposide side of the housing 15. The broken lines 28 in Fig. 4 illustrate the type of light rays emanating from the light source 21 thereby defining its unidirectional field of illumination. Each of the remaining light sources 20 and 22 similarly creates fields of illumination of this nature.

A side wall 29 of the housing 15 opposite the vertical side wall 19 extends vertically upwardly and both of the walls 19 and 29 are attached to a top wall 30 completely covering the housing 15. The side wall 29 has mounted thereon extending inwardly therefrom a plurality of spaced arms 32 each provided with integral mounting plates 33 attached to the wall 29 by fastening means 34. The innermost ends of each of the arms 32 carry integral sockets 35 which internally receive ball members 36 connected to the rear surface of one of three laterally spaced reflex means or mirrored reflectors 38, 39 and 40. The elements 35 and 36 are of known design and provide universal joints allowing the reflectors 38-40 to be positioned at any desired angle. It should be understood, however, that any suitable means capable of positioning the mirrors 38-40 in the manner to be described may be used.

Each of the reflectors 38-40 is carried by its mounting means in a forwardly tilted position so as to describe, with respect to the vertical, angles of approximately 45°. The reflectors may be of any desired shape; however, as illustrated in the drawings each of the reflectors is of elliptical shape and is mounted so that its major axis extends upwardly with respect to the horizontal at approximately 45°. Each of the endmost reflectors 38 and 40 is rotated inwardly toward the center reflector 39 approximately 37°, each of these angles being measured with respect to the displacement of the minor axes of the reflectors 38 and 40 with a 45° plane coinciding with the center reflector 39. The mirrors 38-40 are positioned to intercept the fields of illumination emanating from the light sources 20-22 respectively. To maintain separation between these fields of illumination the interior of the housing 15 is provided with spaced baffles 41 which extend downwardly from the top wall 30 to a point slightly below the horizontal center line of the light sources 20-22.

The bottom of the housing is open and the reading light assembly is completed by the provision of a bottom panel 42 which is provided about the outer margins thereof with upwardly angled flanges 43 which contact the outer surface of the bottom wall of the baggage rack 11 inwardly of the edges of the opening 18 therein. The inner surface of the bottom panel 42 carries spaced upwardly directed studs 44 which are received through the flanges 17 of the housing 15 and removably attached thereto by spring leaves 45 carried by the inner surfaces of the flanges 17 and cooperating with indentations on the outer periphery of the studs 44 to clamp the same. This type of detachable clamping assembly is well known and commonly referred to as a Tinnerman stud. It should be understood, however, that the bottom panel 42 may be removably attached to housing 15 by any suitable means as long as the bottom panel 42 may be removed while the housing 15 is retained in its mounted relation with the surface 11 thereby allowing access to the interior of the housing 15 for maintenance purposes such as replacing one of the light sources 20-22. The bottom panel 42 is further provided with spaced apertures 46 which receive therethrough the bottom portions of the toggle switch assemblies 24 thereby positioning the levers 25 outwardly of the unit 10 for ready accessibility.

The portion of the bottom panel 42 positioned below the reflectors 38-40 is provided with a rectangular opening defined by the inturned flanged edges 47, the upper edges of which support a transparent glass or plastic closure 48 which covers the aperture in the panel 42. Mounted on the inner surface of the closure 48 is a louver unit composed of a plurality of spaced, vertically extending baffle plates 49 which are held in place by transversely extending end plates 50 which are L-shaped in cross section being provided with outwardly directed bottom flanges 51 integral with the bottom edges of the vertical portions 50. Each of the ends of the baffles 49 is provided with right angled flanges 52 which are suitably fastened to the inner surfaces of the plates 50 as, for example, by spot welding.

At spaced intervals about the outer margins of the closure 48, the inner surface of the bottom panel 42 carries attached blocks 53 which receive screws 54 therein, the screws in turn attaching a horizontally extending clip 55 to each of the blocks 53. Each of the clips 55 extends inwardly over the edges of the closure 48 to clamp the same with respect to the aperture in the bottom panel 42. The clips 55 clamping the ends of the closure 48, as shown in Fig. 6, receive between their bottom surfaces and the top surfaces of the closure 48 the outwardly directed bottom flanges 51 of the baffle mounting brackets 50 to fixedly mount the baffles 49 on the inner surface of the closure 48. Resilient gasketing material 56, such as felt or the like, is carried at various locations by the inner surface of the bottom panel 42 to provide a resilient cushion-like seal intermediate the bottom panel 42 and the housing 15 as well as between the bottom panel 42 and the closure 48.

The edges of the bottom surface of the closure 48 just inwardly of the outer margins thereof and the vertical side edges of the closure 48 are provided with an extremely thin coating 57 of opaque, non-reflective material for a purpose to be described. This coating may be in the form of a thin layer of dull black paint or preferably a fired-on black ceramic material. The thickness of the coating 57 should be such that the innermost edges of the portion covering the outer margins of the bottom surface present a knife edge incapable of causing observable reflection in any direction. As will be particularly noted in Figs. 4 and 6, the portion of the coating 57 carried by the bottom surface of the closure 48 extends inwardly of the edges thereof to a point just inwardly of the flanges 47 which define the aperture in the bottom panel 42.

In using the unit 10, the light sources 20–22, by reason of the parabolic reflecting surfaces 27, produce separate horizontally directed fields of illumination which are intercepted by the reflectors 38–40 respectively. Due to the positioning of the reflectors 38–40 at approximately a 45° angle to the horizontal, each of the fields of illumination is redirected downwardly toward the bottom panel 42. The inwardly turned angular relation of the endmost reflectors 38 and 40 further redirects the fields of illumination intercepted thereby toward the center portion of the bottom panel 42 and, in combination with the vertically downward redirection of the center field of illumination by the reflector 39, the three fields of illumination converge at the aperture in the bottom panel 42 and pass through the glass closure 48. As a result of the angular positioning of the endmost reflectors 38 and 40, the total dimensions of the aperture in the bottom panel 42 are less than the total dimensions of the three fields of illumination and a single, substantially reduced area is utilized to pass three separate fields of illumination therethrough for completely independent use outwardly of the unit 10.

Referring to Figs. 1 and 6, the reflector 38 converts the cylindrical field of illumination emanating from the light source 20 into a downwardly and angularly directed cone-shaped field of illumination A which provides the innermost seat 13 with a reading plane 14. The reflector 39 intercepts the cylindrical field of illumination emanating from the light source 21 and redirects the same downwardly in the form of a cone-shaped field of illumination B which provides the center seat 13 with a reading plane 14. Reflector 40 intercepts the cylindrical field of illumination emanating from the light source 22 and redirects the same downwardly at an angular relation in the form of a cone-shaped field of illumination C which provides the outermost seat 13 with a reading plane 14. As a result, three completely separate fields of illumination are intercepted and redirected in convergent relation through a single aperture of considerably less area than the combined area of the three fields. At the same time complete separate identity and non-interference of the three fields of illumination beyond the aperture is maintained to allow individualized use of any one of the same.

The particular arrangement of the reflectors and light sources in combination with the relatively small aperture through which the fields of illumination are reflected for ultimate use provides a compact multiple reading light unit which requires little mounting area while at the same time provides a plurality of completely separate and properly spaced reading planes for use with a plurality of adjacent seats. The baggage rack 11 may be of slight vertical width and still be adequate for mounting the unit 10. At the same time the baggage rack 11 may be of relatively slight horizontal length and upon the mounting of the unit 10 therein there is still considerable mounting area remaining for use with respect to other necessary fixtures, such as air outlets or the like.

Additional features of the reading light unit 10 which are of particular importance deal with the provision of means which eliminate undesirable side reflection of light. These means include the baffles 41, 49 and the thin knife edge coatings 57. In the event that a single light source is being used, the baffles 41 eliminate the reflection of light from the source in use by one of the reflectors not in use. For example, in event that the light source 20 is energized and the light source 21 is not in use, the baffle 41 extending between these sources and their associated reflectors prevents any light rays from the source 20 from contacting the reflector 39 and being redirected downwardly with respect to the seat 13 associated therewith. Consequently, the passenger occupying the middle seat 13 is not annoyed by the use of the reading lights by passengers seated on either side. In other words, the baffles 41 function to limit the width of a field of illumination being redirected by a reflector.

The baffles 49 limit the direction of the redirected fields of illumination to a downward direction and eliminate the observance of the light sources or the reflective observance of the same from points not within the reading planes created by the redirected fields of illumination. As a result, stray light rays do not interfere with the comfort of passengers located in seats in front of or behind the seats which are being illuminated for reading purposes. In order that the baffles 49 will not reflect light themselves these baffles are painted black or treated in a suitable manner so as to provide them with non-reflective surfaces.

An additional safeguard against stray reflection is the provision of the coatings 57 having portions which extend inwardly of the edges of the bottom surface of the closure 48 to prevent light rays from passing through the closure 48 at a point outside of the baffle unit 49 and, in addition, prevent the outer surfaces of the flanges 47 defining the aperture in the bottom panel 42 from reflecting light in directions capable of interfering with the comfort of adjacent passengers. As illustrated in Fig. 6, the redirected fields of illumination A and C are limited by the innermost edges of the portion of the coating 57 carried by the bottom surface of the closure 48. These edges extend inwardly beyond the flanges 47 and restrict the passing of light rays through the closure 48 to an extent that none of the light rays are allowed to contact the outermost surfaces of the flanges 47 to be reflected by the same. This arrangement not only increases the efficiency of the unit 10 but further enhances its value by eliminating any restrictions as to the type of bottom panel 42 which may be used with the unit. As a result, highly polished metal or other normally highly reflective material may be used in forming the panel 42 thereby aiding the over-all appearance of the unit 10.

By reason of the reflectors 38–40 being mounted for universal movement within the housing 15, adjustment may be made in the event that the seats 13 associated with any single unit 10 are moved forwardly or rearwardly with respect thereto. The angularity of the reflectors 38–40 may be readily changed to compensate for the new positions of the seats 13. The positioning angles of 45° and 37° are merely preferred and are not intended to be limiting.

Obviously many modifications and variations of the invention as hereinbefore set forth may be made without departing from the spirit and scope thereof, and therefore only such limitations should be imposed as are indicated in the appended claims.

I claim:

1. A multi-reflex reading light unit including a plurality of light sources each defining separate unidirectional fields of illumination, and separated reflex means each being positioned relative to a single source within the field of illumination thereof to intercept said field and merge the same for redirection through a limited transparent area forming a part of said unit which in size is substantially less than the total area of illumination emanating from said sources, said sources and said reflex means being confined in an enclosure provided with a single aperture defining said limited transparent area, the positioning of said reflex means relative to said transparent area and said sources providing for the maintaining of separate and distinct redirected fields of illumination beyond said transparent area.

2. A multi-reflex reading light unit including a plurality of light sources each defining separate unidirectional fields of illumination, separated reflex means each being positioned relative to a single source within the field of illumination thereof to intercept said field and redirect the same through a limited transparent area forming a part of said unit which in size is substantially less than the total area of illumination emanating from said sources, said sources being arranged in side-by-side relation and being provided with field defining means to form said fields from primarily parallel light rays which fields are also substantially parallel to one another, said reflex means being positioned relative to said transparent area to cause said fields to intercept one another during redirection through said limited transparent area while maintaining separation of said fields beyond said limited area, and means associated with said limited area to restrict the observance of said sources and stray reflection of said fields with respect to points beyond said limited area not within the redirected fields of illumination.

3. A multi-reflex reading light unit including a plurality of light sources each defining separate unidirectional fields of illumination, and reflex means intercepting said fields to redirect the same through a limited area which is substantially less than the total area of illumination emanating from said sources, said sources and said reflex means being confined in an enclosure provided with a single aperture defining said limited area, said reflex means including a plurality of separate reflectors positioned relative to one another with each being located to intercept a separate field of illumination and to merge said fields during redirection of the same through said aperture while re-establishing the independence of said fields beyond said aperture.

4. A multi-reflex reading light unit including a plurality of light sources each defining separate unidirectional fields of illumination, reflex means intercepting said fields to redirect the same through a limited area which is substantially less than the total area of illumination emanating from said sources, said sources and said reflex means being confined in an enclosure provided with a single aperture defining said limited area, said reflex means including a plurality of separate reflectors positioned relative to one another with each being located to intercept a separate field of illumination and to merge said fields during redirection of the same through said aperture while re-establishing the independence of said fields beyond said aperture, and means associated with said aperture to restrict the reflective observance of said sources and stray reflection of said fields with respect to points beyond said aperture not within the redirected fields of illumination.

5. A multi-directional reading light unit for mounting in an overhead bag rack of limited vertical dimensions, said unit including a housing a vertical wall of which carries spaced light sources defining separate longitudinally directed fields of illumination within said housing, a wall of said housing opposite said light sources carrying separate and distinct reflectors each of which intercepts a separate field of illumination, a further wall of said housing being provided with an aperture relative to which said reflectors are positioned to redirect said fields therethrough, the dimensions of said aperture being substantially less than the combined dimensions of said fields, said reflectors being positioned relative to said aperture and one another to cause said fields to intercept one another while passing through said aperture and re-establish separation beyond said aperture.

6. A multi-directional reading light unit for mounting in an overhead bag rack of limited vertical dimensions, said unit including a housing a vertical wall of which carries spaced light sources defining separate longitudinally directed fields of illumination within said housing, a wall of said housing opposite said light sources carrying separate and distinct reflectors each of which intercepts a separate field of illumination, a further wall of said housing being provided with an aperture relative to which said reflectors are positioned to redirect said fields therethrough, the dimensions of said aperture being substantially less than the combined dimensions of said fields, said reflectors being positioned relative to said aperture and one another to cause said fields to intercept one another while passing through said aperture and re-establish separation beyond said aperture, said aperture being provided with a transparent closure provided about the outer margins thereof with a thin strip coating of opaque non-reflective material extending inwardly of the edges of said aperture to eliminate reflection of light by the inner surfaces of said edges, and baffle means associated with said closure to restrict the observance of said sources from points beyond said aperture not within the reflected fields of illumination.

7. A multi-directional reading light unit for mounting in an overhead bag rack of limited vertical dimensions, said unit including a housing a vertical wall of which carries three spaced light sources defining three separate longitudinally directed fields of illumination within said housing, a wall of said housing opposite said light sources carrying three separate reflectors each of which intercepts a separate field of illumination, the bottom wall of said housing being provided with an aperture positioned below said reflectors through which said fields are redirected, the dimensions of said aperture being substantially less than the combined dimensions of said fields, said reflectors being positioned relative to said aperture and one another to cause said fields to intercept one another while passing through said aperture and re-establish separation beyond said aperture, said reflectors each being positioned within its respective field to redirect the same downwardly at substantially right angles to the original direction of said field, the intermediate reflector being positioned to redirect its field in a substantially vertical direction and the end reflectors redirecting their respective fields angularly inwardly toward said intermediate field to cause interception of said fields solely while passing through said aperture.

8. A multi-directional reading light unit for mounting in an overhead bag rack of limited vertical dimensions, said unit including a housing a vertical wall of which carries three spaced light sources each being individually backed up by a parabolic reflecting surface to define three separate longitudinally directed fields of illumination within said housing, a wall of said housing opposite said light sources carrying three separate reflectors each of which intercepts a separate field of illumination, the bottom wall of said housing being provided with an aperture positioned below said reflectors through which said fields are redirected, the dimensions of said aperture being substantially less than the combined dimensions of said fields, said reflectors being positioned relative to said aperture and one another to cause said fields to intercept one another while passing through said aperture and re-establish separation beyond said aperture, said aperture being provided with a transparent closure provided about the outer margins thereof with a thin strip coating of opaque non-reflective material extending inwardly of the edges of said aperture to eliminate reflection of light by the inner surfaces of said edges, and baffle means associated with said closure to restrict the observance of said sources from points beyond said aperture not within the reflected fields of illumination, said baffle means including spaced louvers mounted on the inner surface of said closure and positioned within said housing, said reflectors each being positioned within its respective field to redirect the same downwardly at substantially right angles to the original direction of said field, the intermediate reflector being positioned to redirect its field in a substantially vertical direction and the end reflectors redirecting their respective fields angularly inwardly toward said intermediate field to cause interception of said fields solely while passing through said aperture, said reflectors each being shaped to define substantially cone-shaped redirected fields of illumination.

9. A multi-directional reading light unit for mounting in an overhead bag rack of limited vertical dimensions, said unit including a housing a vertical wall of which carries three spaced light sources defining three separate longitudinally directed fields of illumination within said housing, a wall of said housing opposite said light sources carrying three separate reflectors each of which intercepts a separate field of illumination, the bottom wall of said housing being provided with an aperture positioned below said reflectors through which said fields are redirected, said reflectors being positioned relative to said aperture and one another to cause said fields to intercept one another while passing through said aperture and re-establish separation beyond said aperture, said reflectors each being positioned within its respective field to redirect the same downwardly at substantially right angles to the original direction of said fields, the intermediate reflector being positioned to redirect its field in a substantially vertical direction and the end reflectors redirecting their respective fields angularly inwardly toward said intermediate fields to cause interception of said fields solely while passing through said aperture.

References Cited in the file of this patent

UNITED STATES PATENTS

| | | |
|---|---|---|
| 1,395,026 | Wood | Oct. 25, 1921 |
| 1,400,926 | Wood | Dec. 20, 1921 |
| 1,419,482 | Wood | June 13, 1922 |
| 1,551,461 | Bloomingdale | Aug. 25, 1925 |
| 1,817,100 | Robinson et al. | Aug. 4, 1931 |
| 1,845,628 | Roth | Feb. 16, 1932 |
| 2,106,995 | Clary | Feb. 1, 1938 |
| 2,173,899 | Doane | Sept. 26, 1939 |
| 2,253,933 | Hall | Aug. 26, 1941 |
| 2,582,738 | Arenberg | Jan. 15, 1952 |
| 2,696,550 | Neugass | Dec. 7, 1954 |

FOREIGN PATENTS

| | | |
|---|---|---|
| 463,918 | Great Britain | Apr. 8, 1937 |